United States Patent

[11] 3,621,355

| [72] | Inventor | Edward H. Dinger |
| | | Waynesboro, Va. |
| [21] | Appl. No. | 23,585 |
| [22] | Filed | Mar. 30, 1970 |
| [45] | Patented | Nov. 16, 1971 |
| [73] | Assignee | General Electric Company |

[54] DOUBLE HALF WAVE MOTOR CONTROL
18 Claims, 5 Drawing Figs.

[52] U.S. Cl. .................................................. 318/345,
318/345
[51] Int. Cl. .................................................. H02p 5/16
[50] Field of Search .................................... 318/331,
341, 345

[56] References Cited
UNITED STATES PATENTS

| 2,905,876 | 9/1959 | Hillman | 318/331 |
| 3,177,418 | 4/1965 | Meng | 318/331 |
| 3,411,062 | 11/1968 | Kamens | 318/331 |
| 3,414,791 | 12/1968 | Munson | 318/345 |
| 3,504,260 | 3/1970 | Staples | 318/341 |

*Primary Examiner*—T. E. Lynch
*Assistant Examiner*—Thomas Langer
*Attorneys*—Michael Masnik, Frank L. Neuhauser, Joseph B. Forman and Oscar B. Waddell ABSTRACT: A control circuit for a DC motor pulses the motor armature every half cycle, but maintains a discontinuous armature current as in a half wave motor control circuit. The assurance of discontinuity allows the motor e.m.f. to be used as a speed feedback voltage. The armature is placed across the output terminals of a full-wave rectifier comprising four controlled rectifiers. The input controlled rectifiers provide pulses of current to the armature. At the start of each half cycle the turn-on time of the output controlled rectifiers is delayed. With the latter controlled rectifiers turned off at the beginning of each half cycle, there is no current path which allows the armature current to decay slowly. The armature current is forced to go rapidly to zero and discontinuity of the armature current is assured.

DOUBLE HALF WAVE MOTOR CONTROL

BACKGROUND OF THE INVENTION

The invention is in the field of DC motor control circuits and is specifically related to a single-phase full-wave motor control circuit having many of the characteristics of single-phase half-wave motor control circuits.

The desirable performance characteristics of half-wave motor control circuits result primarily from the fact that the armature currents are always discontinuous regardless of motor load conditions. A discontinuous armature current allows the motor back emf to be used as a speed feedback signal during the time in each cycle when the armature current is zero. The armature voltage in a half-wave drive thus supplies effectively a tachometer feedback signal of motor speed.

In a typical full-wave motor control circuit the advantage is that the armature is pulsed twice every cycle, once every half cycle, but there is the disadvantage that the armature current will not necessarily be discontinuous. For certain loads and motor speeds the armature current may never go to zero and therefore the motor back emf cannot be used as a speed feedback signal.

SUMMARY OF THE INVENTION

In accordance with the present invention a DC motor control circuit is provided which is capable of pulsing the armature every half cycle but also provides assurance that the armature current will be discontinuous thereby allowing the armature back emf to be used as a speed feedback signal. The motor armature is connected between the output terminals of a full wave bridge rectifier including a pair of input controlled rectifiers and a pair of output controlled rectifiers. The input controlled rectifiers are triggered at a time caused by the firing angle of the associated firing circuit to supply a pulse of current to the armature winding. The output controlled rectifiers are delayed in being rendered conductive at the beginning of every half cycle in order to prevent any conduction path at the beginning of each half cycle. This ensures that the armature current goes to zero thereby maintaining discontinuity of armature current. The output controlled rectifiers also connect the main source of supply to the motor field winding.

The motor back emf is applied to a speed control circuit for controlling the motor speed. The speed control circuit generates a firing signal which adjusts the firing angle of the input controlled rectifiers. A sawtooth waveform which is synchronized with the supply voltage operates to smooth the speed control circuitry as well as controlling current limiting circuitry. The current limiting circuitry operates to prevent firing of the input controlled rectifiers at the beginning of each half wave.

DETAILED DESCRIPTION OF THE INVENTION

Figure 1:
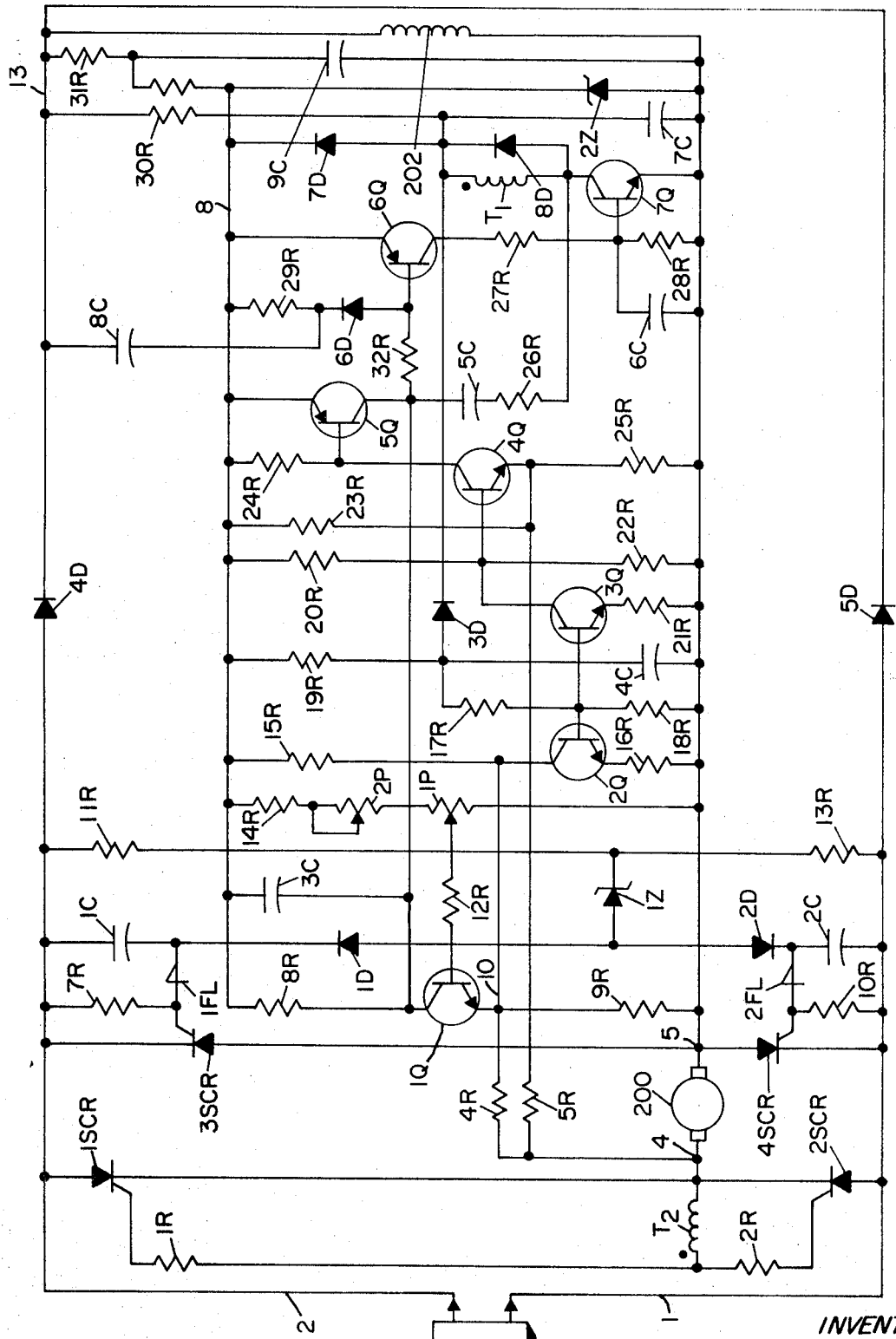
FIG. 1 is a schematic diagram of a preferred embodiment of a motor control circuit in accordance with the present invention.

In the motor control circuit of FIG. 1, the AC power is supplied thereto on wires or mains 1 and 2. The mains 1 and 2 are connected to a full-wave bridge rectifier comprising control rectifiers 1SCR, 2SCR, 3SCR, and 4SCR, all of which may be conventional thyristor devices. The armature 200 of the motor to be controlled is connected across the output terminals 4, 5, of the full-wave bridge rectifier. The gate terminals of the input controlled rectifiers 1SCR and 2SCR are connected to the secondary $T_2$ of a firing transformer by means of resistors 1R and 2R, respectively. The other side of the secondary $T_2$ is connected to the cathodes of the input controlled rectifiers. The input controlled rectifiers are fired by causing a voltage pulse of sufficient magnitude to appear across the secondary $T_2$. The particular SCR which is fired, or caused to conduct, is the one having a positive potential at its anode. As will be explained below, a firing pulse appears across $T_2$ every half cycle and therefore the controlled rectifiers 1SCR and 2SCR are alternately fired to send a pulse of current through the armature 200 in the direction from terminal 4 to terminal 5.

The gating circuit for the output controlled rectifiers 3SCR and 4SCR includes in common the voltage divider 11R, 13R, connected in series across the mains 1 and 2, and a Zener diode 1Z. The gate circuit for controlled rectifier 3SCR includes a diode 1D, a charging capacitor 1C, a four-layer switch 1FL, and a resistance 7R. The gate circuit for controlled rectifier 4SCR likewise includes a diode 2D, a capacitor 2C, a four layer switch 2FL, and a resistance 10R. The latter mentioned gating circuitry operates to delay the turn-on times of the controlled rectifiers 3SCR and 4SCR until a predetermined time after the start of each half cycle. The delay is accomplished as follows. Assume the circuit is operating during the half cycle when main 2 is positive with respect to main 1. The voltage at the junction of resistors 11R and 13R is connected to the gate of 4SCR through Zener diode 1Z, diode 2D, and four-layer switch 2FL. When the voltage at the junction of resistors 11R and 13R rises above the Zener voltage of diode 1Z, capacitor 2C begins to charge. When the voltage on capacitor 2C reaches the breakdown voltage of the four layer switch 2FL, the latter switch reverts to its low voltage condition and connects the voltage from capacitor 2C to the gate of 4SCR thereby turning on 4SCR. The controlled rectifier 3SCR is turned on in a similar manner by the corresponding circuitry. The latter circuitry assures that the output controlled rectifiers will not be turned on initially during each half cycle and this assures that the armature current will be discontinuous. An understanding of why the delay assures a discontinuous armature current can be had by first considering the armature voltage and current which would occur if the controlled rectifiers 3SCR and 4SCR were instead simple diodes.

Figure 2:
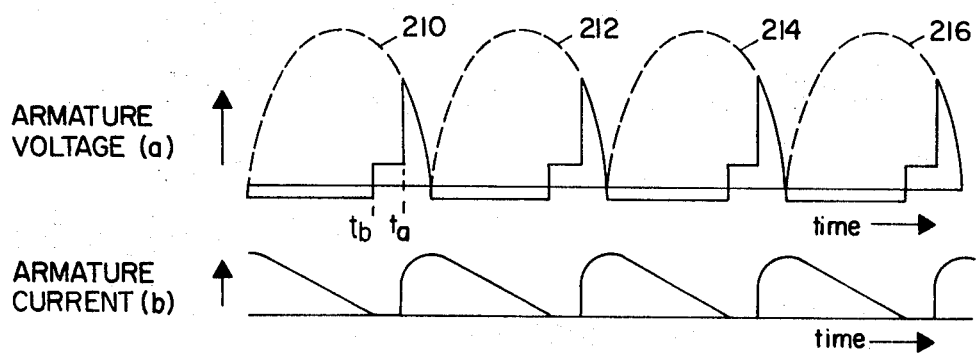
FIG. 2 illustrates waveforms representing armature voltage and current which would occur in a single-phase full-wave control circuit which does not include means for ensuring that the armature current is discontinuous.

The armature voltage and current waveforms for the situation where the controlled rectifiers 3SCR and 4SCR are simple diodes are shown in waveforms a and b, respectively, of FIG. 2. The dashed line in FIG. 2 represents the full wave rectified AC voltage applied across mains 1 and 2. Portions 210 and 214 represent the waveform when mains 2 is positive with respect to mains 1, whereas portions 212 and 216 represent the waveform when mains 1 is positive with respect to mains 2. At time $t_a$, when mains 2 is positive with respect to mains 1, 1SCR will be fired causing a current pulse such as that shown in waveform b of FIG. 2 to be applied to the armature 200. The current path is from mains 2 through controlled rectifier 1SCR, through the armature 200 and through the "simple diode" which is assumed to be substituted for controlled rectifier 4SCR. At the end of the half cycle and the beginning of the next half cycle, the "simple diode" assumed substituted for controlled rectifier 3SCR will provide a low-impedance path for the decay of the armature current. This path includes the armature, the latter-mentioned simple diode, and 1SCR. During this slow decay time, the armature emf does not represent the speed of the motor. For the particular example shown in FIG. 2 it is assumed that the armature current reaches zero at time $t_b$. Consequently, for a short time between $t_b$ and the next firing pulse at a time $t_a$, the armature current will be at zero and the back emf of armature 200 will represent the speed of the motor. Thus, 1SCR and 2SCR in conjunction with a circuit comprising $T_2$ operate as a first switching means which cooperates with a second switching means comprising 3SCR and 4SCR, 3SCR and 4SCR in conjunction with a circuit comprising 1FL and 2FL operate as a second switching means. The first and second switching means, when both operative, act to apply a pulse of current every half cycle of said AC voltage to said armature winding and the second switching means is operative a predetermined time interval after the zero crossing of the mains voltage and within a half cycle of said crossing for ensuring that the armature current effectively goes to zero every half cycle. However, it can be seen from the graph that for a different load and for different speed conditions the armature current may not reach zero and the armature emf may never be used as a speed control voltage.

Figure 3:
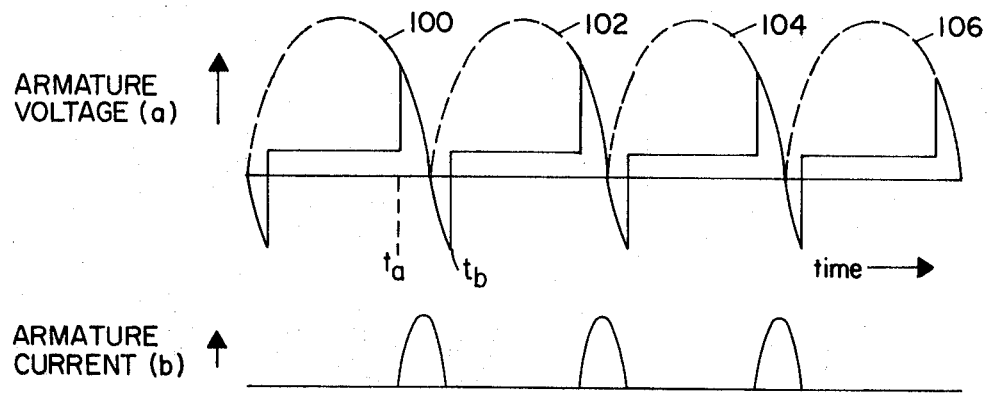
FIG. 3 illustrates waveforms representing armature voltage and current resulting from a motor control circuit which ensures a discontinuous armature current such as that shown in FIG. 1.

The above situation is contrasted with the armature voltages and currents occurring in the invention of FIG. 1 as illustrated in waveforms $a$ and $b$, respectively, of FIG. 3. In waveform $a$ the dashed line once again represents the AC voltage across mains 1 and 2 in full-wave rectified form. Sections 100 and 104 of the dashed line represent the condition when mains 2 is positive with respect to mains 1 whereas sections 102 and 106 of the dashed waveform represent the situation where mains 1 is positive with respect to mains 2. In the case of FIG. 3, wherein controlled rectifiers 3SCR and 4SCR are not turned on at the beginning of each half cycle, the armature current is forced to be discontinuous. At time $t_a$, once again, the controlled rectifier 1SCR is fired causing it to turn on and provide a current pulse through armature 200 and through controlled rectifier 4SCR, which was turned on some time during the instant half cycle. At the end of the half cycle, unlike the case described in connection with FIG. 2, the controlled rectifier 3SCR is not turned on and therefore no low-impedance current path exists for the armature current. Consequently, the armature current is forced to go rapidly to zero as shown in waveform $b$ of FIG. 3. The motor back emf thus represents the speed of the motor for a large part of each cycle.

Figure 4:
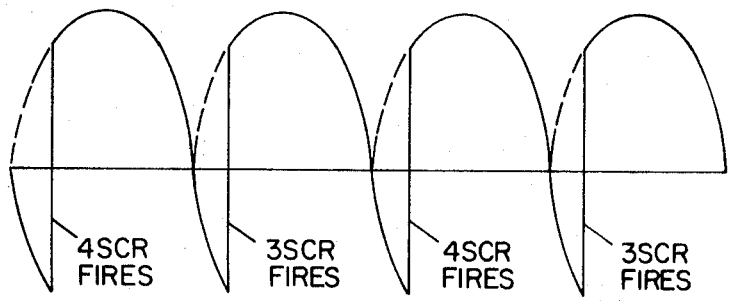
FIG. 4 illustrates a waveform representing the voltage across the motor field winding of the circuit shown in FIG. 1.

The controlled rectifiers 3SCR and 4SCR also operate in conjunction with the diodes 4D and 5D to supply power to the motor field winding 202. When mains 2 is positive with respect to mains 1, and when controlled rectifier 4SCR is turned on, current is supplied to the field winding 202 through diode 4D and controlled rectifier 4SCR. When mains 1 is positive with respect to mains 2, and controlled rectifier 3SCR is conducting, current is supplied to the field winding 202 through diode 5D and controlled rectifier 3SCR. A waveform diagram of the armature voltage is illustrated in FIG. 4. It can be seen from FIG. 4 that the amount of delay in the turn-on times for controlled rectifiers 3SCR and 4SCR affects the voltage supply to the field. More delay results in a lower average field voltage.

The voltage appearing across field winding 202 appears on line 13 and performs a number of other functions in the control circuitry to be described hereafter. Resistance 31R in combination with capacitor 9C and Zener diode 2Z operate to generate a regulated voltage on line 8. The voltage to the latter components is supplied from the field voltage on line 13. Line 13 also supplies voltage to a firing circuit which includes a resistor 3OR, a capacitor 7C, a transistor 7Q and the primary $T_1$ of the firing transformer. Furthermore, the field voltage on line 13 is applied through capacitor 8C and diode 6D to the base of a transistor 6Q which operates, as will be more fully described hereafter to synchronize a speed regulator circuit and the firing circuit.

The speed regulator circuit includes error transistor 1Q, emitter resistor 9R, collector resistor 8R, base resistor 12R, potentiometer 1P, and feedback resistor 4R. The feedback resistor 4R is connected between terminal 4 of armature 200 and the emitter of the error transistor 1Q. The setting of arm 6 of potentiometer 1P determines the speed of the motor by determining the time during each half cycle at which error transistor 1Q will conduct. A negative going sawtooth waveform, which is generated in a manner to be described hereafter, is applied to the emitter of transistor 1Q from the collector of a transistor 2Q. During steady state operation, assuming the potentiometer is set at any particular value and that the motor back emf representing motor speed is applied to the emitter of transistor 1Q through the resistor 4R, the speed regulator operates as follows. During the beginning of each half cycle the transistor 1Q will be nonconducting. As the half cycle progresses, the voltage at the emitter of transistor 1Q decreases due to the decreasing sawtooth voltage on line 10. At some point determined by the setting of potentiometer 1P and the motor back emf, transistor 1Q will conduct causing a firing pulse to appear on the collector of transistor 1Q. The particular manner in which the negative going pulse at the collector of 1Q causes firing will be described below.

Now assuming that the speed is to be increased, the arm of potentiometer 1P is moved to increase the voltage applied to the base of transistor 1Q. This initially causes transistor 1Q to produce the negative going pulse and its collector at a much earlier time during each half cycle. This substantially increases the firing angle of the controlled rectifiers 1SCR and 2SCR and thereby substantially increases the current pulse supplied to the motor armature 200. The increased current causes the motor to speed up which, in turn, causes the motor back emf to increase. Finally, a steady state condition will be reached with the motor operating at a higher speed and with transistor 1Q turning on at a slightly advanced time, with respect to the previous steady state condition, during each half cycle.

The manner in which a negative going pulse at the collector of 1Q initiates firing of the controlled rectifiers 1SCR and 2SCR will now be described. The voltage on line 13 is connected to and charges capacitor 7C through the resistance 3OR up to a maximum value caused by the clamping action of diode 7D and the regulated voltage in line 8. Transistors 6Q and 7Q will normally be nonconducting. When a negative going pulse appears at the collector of the transistor 1Q, it will be applied to the base of transistor 6Q through the resistance 32R thereby causing conduction of transistor 6Q. The collector of transistor 6Q is connected to the base of transistor 7Q via the voltage divider comprising resistors 27R and 28R. Transistor 7Q will turn on thereby lowering the potential at its collector. Regenerative feedback between the collector of transistor 7Q and the base of transistor 6Q is provided by resistor R26 and capacitor 5C. Consequently, 7Q turns on rapidly creating a path for the voltage stored on capacitor 7C. The result is that a sufficiently large voltage pulse is created across the primary $T_1$ of the firing transformer to cause firing of either of the controlled rectifiers 1SCR or 2SCR. It will be noted that as soon as one of the controlled rectifiers 1SCR and 2SCR is fired, the increased current through the armature results in an increased feedback voltage applied to the emitter of transistor 1Q thereby turning off transistor 1Q which, in turn, causes transistors 6Q and 7Q to be turned off. Consequently, capacitor 7C will not be fully discharged by the firing action just described.

Synchronization of the firing pulse with each half cycle is caused by the synchronized sawtooth wave applied to line 10, as previously described. The latter sawtooth voltage is generated and synchronized with the main voltage as follows. The regulated voltage across Zener diode 2Z is applied to a charging capacitor 4C via resistance 19R. The junction of resistance 19R and the charging capacitance 4C is connected to the anode of a diode 3D whose cathode is connected to storage capacitor 7C. Initially, a charge builds up on 4C during the half cycle. Near the very end of the half cycle, the voltage on line 13, as shown in FIG. 4, will be very low and will be applied to the base of transistor 6Q via capacitor 8C and diode 6D. This will cause 6Q to conduct which, in turn, will cause 7Q to conduct in the manner previously described. The latter two transistors will conduct during the end of the half cycle, thereby causing capacitor 7C to fully discharge through a saturated primary winding $T_1$ of the firing transformer. When 7C is discharged, diode 3D is no longer blocked and charging capacitor 4C also discharges through the saturated primary winding $T_1$. At the beginning of the next half cycle capacitor 4C begins charging again.

The positive going sawtooth waveform created at the junction of resistance 19R and 4C is applied via voltage divider 17R, 18R, to the base of transistor 2Q. The emitter of transistor 2Q is connected to terminal 5 via a resistance 16R and the collector of transistor 2Q is connected to the regulated voltage line 8 via a resistance 15R. The collector is also connected to line 10 which is connected to the emitter of transistor 1Q. The sawtooth waveform appearing on line 10 will thus be a negative going sawtooth waveform synchronized with each half cycle of the main AC voltage.

The sawtooth waveform also synchronizes a current limiting circuit which includes transistors 3Q, 4Q, and 5Q, and resistors 20R, 21R, 22R, 23R, 24R and 25R. Transistor 5Q operates when conducting to provide a relatively high voltage at the base of 6Q thereby blocking the firing action of the circuit in response to any negative going voltage pulse at the collector of 1Q. The purpose of the blocking action is to prevent firing during the early portion of each half cycle and thereby limit the current which may be applied to the armature. Conduction of transistor 5Q is controlled by transistor 4Q. When the latter is cut off, transistor 5Q will also be cut off. When the latter is conducting, transistor 5Q will be conducting. Four control voltages are applied to transistor 4Q. A voltage reference set by voltage divider 20R, 22R, is applied to the base of 4Q along with a negative going synchronized sawtooth voltage taken from the collector of transistor 3Q. The latter negative going sawtooth voltage is developed by connecting the positive going sawtooth voltage appearing at the junction of resistors 17R, 18R, to the base of transistor 3Q. A second reference voltage set by voltage divider 23R, 25R, is applied to the emitter of transistor 4Q along with a speed feedback voltage supplied via resistor 5R from terminal 4 of the motor armature 200. The first and second reference voltages set by the voltage dividers are at values which will cause transistor 4Q to be initially conducting. Consequently, during the initial part of each half cycle 5Q will be conducting and will block any firing action. As the half cycle progresses, the negative going sawtooth voltage on the collector of transistor 3Q lowers the base voltage of transistor 4Q and eventually cuts off transistor 4Q. Transistor 5Q, in turn, will be cut off thereby removing the blocking voltage from the base of transistor 6Q. The feedback resistor 5R connected between the emitter of 4Q and the terminal 4 of motor armature 200 applies an increased voltage to the emitter of 4Q at higher motor speeds. This ensures that the blocking voltage from the firing circuit will be removed at an earlier time when the motor requires larger currents to maintain the high speed.

Figure 5:
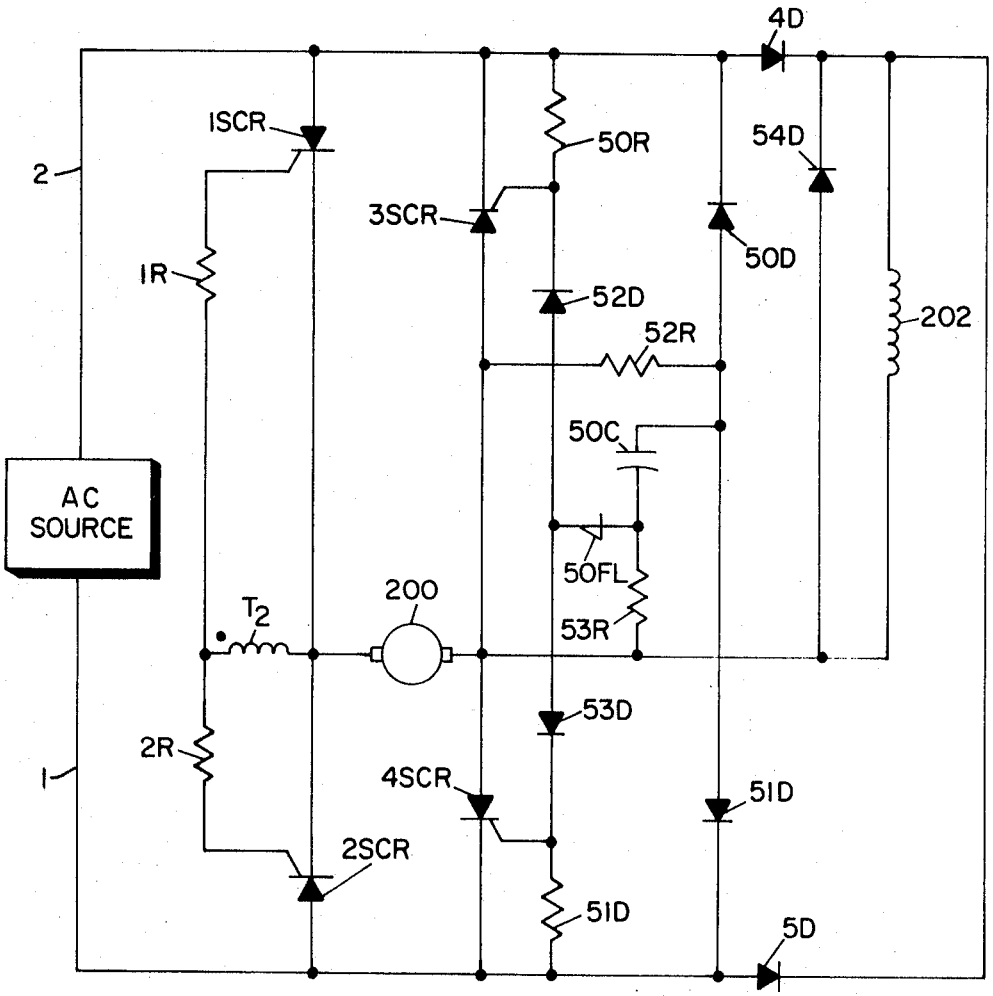
FIG. 5 is a schematic drawing illustrating an alternate preferred embodiment of the circuit of the present invention.

The circuitry described above for causing a delay in the firing of controlled rectifiers 3SCR and 4SCR will result in identical delays for each of the controlled rectifiers provided that capacitors 1C and 2C are equal, and that the four layer switches 1FL and 2FL have identical breakdown voltages and low voltage points. An improvement over the delay controlling circuitry shown in FIG. 1 is illustrated in FIG. 5 wherein elements which are identical to those of FIG. 1 are designated by the same numerals and letters. Furthermore, for the sake of simplicity the speed-regulating circuit, synchronized sawtooth waveform-generating circuit, voltage regulator circuit, current-limiting circuit, and firing circuit are not shown, but it will be apparent that these latter circuits are intended to be as much a part of FIG. 5 as they are a part of FIG. 1. In FIG. 5, the delay controlling circuit for delaying the turn-on of controlled rectifiers 3SCR and 4SCR includes a single four-layer switch 50FL and a single charging capacitor 50C which are common to both 3SCR and 4SCR. One side of capacitor 50C is connected to the junction of diodes 50D and 51D. The other side is connected to the four-layer switch 50FL and to a resistance 53R. The four-layer switch is connected through diode 53D and resistance 51R to main 1, and through diode 52D and 50R to main 2. In operation, assuming main 2 is positive with respect to main 1, current flows through the field winding 202, resistance 53R, capacitance 50C, and diode 51D to main 1. Current also flows from the field winding through resistance 52R and through diode 51D to main 1. When the voltage across capacitor 50C reaches the breakdown voltage of switch 50FL, the latter switch reverts to its low-voltage point and passes current to the gate of controlled rectifier 4SCR thereby turning on the latter controlled rectifier. When main 1 is positive with respect to main 2, the controlled rectifier 3SCR is turned on in a like manner.

What I claim as new and desire to secure by Letters Patent of the United States is:

1. A motor control circuit for controlling a motor having an armature winding and a field winding comprising:
   a. a pair of mains for carrying an AC voltage,
   b. first and second switching means,
   c. said first switching means connected to said mains and operative in combination with said second switching means for applying a pulse of current to said armature winding every half cycle of said AC voltage, and
   d. said second switching means connected to said mains and operative a predetermined time interval after the zero crossing of the mains voltage and within a half cycle of said crossing for ensuring that said armature current goes to zero every half cycle.

2. A motor control circuit as claimed in claim 1 wherein said switching means for ensuring comprises:
   a. first and second asymmetrically conductive devices of the type which are rendered conductive in response to the application of a turn-on voltage to a control terminal thereof, said first and second asymmetrically conductive devices being connected respectively to provide conduction paths between said armature and said mains, and
   b. delay turn-on means, connected to said mains and said control terminals of said first and second asymmetrically conductive devices, for alternately turning on said latter devices a predetermined time following the start of each half cycle of said AC voltage.

3. A motor control circuit as claimed in claim 2 wherein said switching means for applying comprises:
   third and fourth asymmetrically conductive devices of the type which are conductive in response to the application of a turn-on voltage to a control terminal thereof, said third and fourth asymmetrically conductive devices being connected with said mains, said armature winding and said first and second asymmetrically conductive devices to form a full-wave bridge rectifier comprising said first, second, third and fourth asymmetrically conductive devices with said mains connected across the input terminals of said full-wave bridge rectifier and said armature winding connected across the output terminals of said full-wave bridge rectifier.

4. A motor control circuit as claimed in claim 3 wherein said field winding is connected with said mains and said first and second asymmetrically conductive devices so that a current path between said mains and said field winding includes the conducting one of said first and second asymmetrically conductive devices.

5. A motor control circuit as claimed in claim 4 further comprising:
   a. a triggering circuit means responsive to a triggering voltage applied thereto for applying a turn-on voltage alternately to the control terminals of said third and fourth asymmetrically conducting devices,
   b. speed control means connected to receive a feedback voltage from said armature winding for periodically providing a triggering voltage to said triggering circuit means, and
   c. synchronizing means connected to said speed control means for synchronizing the period of said synchronizing means with the half period of said AC voltage.

6. A motor control circuit as claimed in claim 5 further comprising current limiting means, connected to said synchronizing means, said armature, and said triggering circuit means, for blocking the application of a triggering voltage to said triggering circuit means for a time at the beginning of each half cycle of said AC voltage inversely proportional to the motor speed.

7. A motor control circuit as claimed in claim 4 further comprising:
a. voltage regulator means connected to said field winding for developing a regulated DC voltage,
b. capacitive storage means connected to said field winding and clamped to said regulated DC voltage for storing a voltage,
c. triggering circuit means responsive to a turn-on voltage applied to an input thereof for providing a discharge path for the voltage stored on said capacitive storage means, said discharge path including the primary winding of a transformer, the secondary winding being connected to apply a turn-on voltage to the control terminals of said third and fourth asymmetrically conductive devices,
d. means connected to said field winding for applying a turn-on voltage to said triggering circuit for sufficient time at the end of each half cycle of said AC voltage to discharge said capacitive storage means and to saturate said primary winding,
e. sawtooth generating means for generating a sawtooth voltage waveform synchronized to each said half cycle of said AC voltage, said generating means comprising, a charging capacitor connected to said regulated voltage and connected by a diode to said discharge path whereby the voltage built up on said charging capacitor during a half cycle discharges through said discharge path when said primary winding saturates,
f. speed regulator means for applying a turn-on voltage to said triggering circuit means once each half cycle at a time during each half cycle determined by a speed control setting, said regulator means comprising a potentiometer connected to said regulator voltage and having a wiper arm serving as the speed control setting, an error transistor having its base connected to receive a voltage from said wiper arm, its collector connected to the input of said triggering circuit means and its emitter connected to receive a feedback speed voltage from said armature winding and a decreasing sawtooth waveform from said sawtooth-generating means, whereby said error transistor turns on and transfers a turn-on voltage to said triggering circuit during each half cycle at a time dependent upon said speed feedback voltage, and
g. current-limiting means connected to said sawtooth generator, said armature winding and said triggering circuit means for blocking the application of a turn-on voltage from said speed regulator to said triggering circuit means for a time at the beginning of each said half cycle inversely proportional to the motor speed.

8. A motor control circuit as claimed in claim 6 wherein said delay turn-on means comprises:
a. a capacitor connected to be charged in the same direction each half cycle by said AC voltage, and
b. a two terminal breakdown switch means, connected at one terminal to said capacitor and at the other terminal to the control terminals of said first and second asymmetrically conducting devices, whereby a buildup of voltage on said capacitor causes breakdown of said switch means and the application of a turn-on voltage to said control terminals.

9. A motor control circuit as claimed in claim 8 wherein said asymmetrically conductive devices are thyristors.

10. An arrangement for operating a DC motor, comprising an armature and field, from a source of AC comprising first and second switching means, said means comprising a controlled rectifier means responsive to said AC to apply portions of full wave rectified half cycles of AC to said armature, said first switching means operative in combination with said second switching means for establishing in each half cycle of AC the time of application of said portions of said rectified half cycle of AC voltage to said motor, and said second switching means operative for ensuring that the current in said armature has first gone to zero before the application of said rectified half cycles of AC voltage to said motor.

11. An arrangement according to claim 10 further comprising means for controlling the speed of said motor, said last-named means comprising means responsive to the magnitude of back electromotive force developed by said motor for further controlling the time of application of said portion of said rectified half cycles of AC voltage to said motor.

12. An arrangement according to claim 11 further comprising means for supplying full wave rectified DC to said field, said last-named means comprising a portion of said controlled rectifier means.

13. An arrangement for controlling a DC motor from a source of AC wherein said motor comprises an armature and field, means for applying a pulse of current to said armature winding every half cycle of applied power comprising a first full-wave bridge rectifier, said rectifier comprising two pairs of SCRs having individual gating electrodes, said rectifier responsive to AC to apply portions of full-wave rectified half cycles of AC to said armature, a source of gating signals, means for applying said gating signals to one pair of said SCRs for establishing in each half cycle of AC the time of application of said portions of said rectified half cycles of AC voltage to said armature, and switching means coupled to the other pair of said SCRs for ensuring that the current in said armature has first gone to zero before the application of said rectified half cycles of AC voltage to said armature.

14. An arrangement according to claim 13 further comprising means for controlling the speed of said motor, said last-named means comprising means responsive to the magnitude of back electromotive force developed by said motor for controlling the gating of the other pair of SCRs to further control the time of application of said portions of said rectified half cycles of AC voltage to AC motor.

15. An arrangement according to claim 14 further comprising means for supplying full-wave rectified DC to said field, said last-named means comprising a pair of unidirectionally conducting devices, said devices and said first pair of SCRs operating as a second full-wave bridge rectifier for supplying said full-wave rectified DC.

16. An arrangement to claim 15 wherein said unidirectionally conducting devices comprise a pair of diodes.

17. In combination a motor having an armature and a field winding, means for applying a pulse of current to said armature winding every half cycle of applied power comprising a full-wave, four-arm bridge rectifier, said rectifier comprising a pair of AC input terminals and a pair of DC output terminals, a respective SCR in each arm of said bridge, said armature connected across the DC output terminals, said field winding connected at one end through respective diodes to a respective one of said AC input terminals, the other end of said field winding being connected to one of said DC terminals, means for alternately gating during a respective half cycle of said AC input voltage and at a predetermined time after the zero AC crossing of the AC voltage one of the pair of said SCRs which is connected in series across said AC terminals and to said one DC terminal for ensuring that said armature current goes to zero every half cycle, means for comparing the back electromotive force of said armature during each half cycle of said AC input voltage and during the time the armature current is zero with a reference signal to obtain an error signal, and means for alternately gating during a respective half cycle of said AC input voltage one of the other of said pair of SCRs at a time which is a function of the magnitude of said error signal.

18. In combination a motor having an armature and a field winding, means for applying a pulse of current to said armature winding every half cycle of applied power comprising a full-wave bridge comprising a pair of AC input terminals and a pair of DC output terminals, a respective power switching device in each arm of said bridge, said armature connected across the DC output terminals, said field winding connected at one end through respective unidirectional conducting devices to a respective one of said AC input terminals, the other end of said field winding being connected to one of said DC terminals, means for alternately operating during a respective half cycle of said AC input voltage and at a predetermined time after the zero AC crossing of the AC voltage one of said pair of said devices which is connected in series across said AC terminals and to said one DC terminal for ensuring that said armature current goes to zero every half cycle, means responsive to the back electromotive force of said armature during each half cycle of said AC input voltage and during the time the armature current is zero to obtain an error signal, and means for alternately operating during a respective half cycle of said AC input voltage one of the other of said pair of devices at a time which is a function of the magnitude of said error signal.

* * * * *